(12) United States Patent
Iwamoto

(10) Patent No.: US 9,019,441 B2
(45) Date of Patent: Apr. 28, 2015

(54) LIQUID CRYSTAL DISPLAY DEVICE, AND METHOD AND DEVICE FOR MANUFACTURING SAME

(75) Inventor: Takashi Iwamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 347 days.

(21) Appl. No.: 13/518,402

(22) PCT Filed: Nov. 26, 2010

(86) PCT No.: PCT/JP2010/071133
§ 371 (c)(1),
(2), (4) Date: Jun. 22, 2012

(87) PCT Pub. No.: WO2011/080975
PCT Pub. Date: Jul. 7, 2011

(65) Prior Publication Data
US 2012/0257138 A1 Oct. 11, 2012

(30) Foreign Application Priority Data
Dec. 28, 2009 (JP) ................................. 2009-298497

(51) Int. Cl.
G02F 1/1333 (2006.01)
F21V 7/04 (2006.01)
G06F 1/16 (2006.01)
H04M 1/02 (2006.01)

(52) U.S. Cl.
CPC .... G02F 1/133308 (2013.01); G02F 2201/465 (2013.01); G06F 1/1637 (2013.01); H04M 1/0266 (2013.01); G06F 1/1656 (2013.01)

(58) Field of Classification Search
CPC ............ G02F 1/133308; G02F 1/1333; G02F 1/133608

USPC ..................................... 349/58; 362/632–634
See application file for complete search history.

(56) References Cited

U.S. PATENT DOCUMENTS 6,741,299 B2 * 5/2004 Fukayama et al. .............. 349/58
8,009,260 B2 * 8/2011 Chen et al. .................... 349/152
(Continued)

FOREIGN PATENT DOCUMENTS

| JP | 05-080334 A | 4/1993 |
| JP | 2003-140115 A | 5/2003 |

(Continued)

OTHER PUBLICATIONS

Official Communication issued in International Patent Application No. PCT/JP2010/071133, mailed on Feb. 1, 2011.

Primary Examiner — Hoan C Nguyen
(74) Attorney, Agent, or Firm — Keating & Bennett, LLP

(57) ABSTRACT

A liquid crystal display device includes at least one engagement structure for fixing a bezel (10) to a chassis (40). The engagement structure includes a recessed portion (42) formed in a side surface (41) of the chassis and a pair of arms (50a, 50b) formed in a side wall (11) of the bezel. The pair of arms is each cantilevered and placed such that the fixed ends (51a, 51b) are positioned outward relative to the free ends (52a, 52b), respectively. The pair of arms can mutually support each other by being elastically deformed toward the chassis, and the free ends of the arms are at least partially fitted in the recessed portion of the chassis when the pair of arms is in the mutually supporting state, thus fixing the bezel to the chassis. Consequently, it is possible to reduce the width of the frame area and to automate the process of fixing the bezel.

7 Claims, 9 Drawing Sheets

(56) References Cited

U.S. PATENT DOCUMENTS

| | | | |
|---|---|---|---|
| 2005/0206799 A1* | 9/2005 | Li et al. | 349/58 |
| 2006/0118684 A1* | 6/2006 | Wu et al. | 248/225.11 |
| 2006/0171172 A1* | 8/2006 | Li et al. | 362/633 |
| 2008/0100770 A1* | 5/2008 | Chen et al. | 349/58 |
| 2008/0123015 A1* | 5/2008 | Tanaka | 349/58 |

FOREIGN PATENT DOCUMENTS

| | | |
|---|---|---|
| JP | 2005-241823 A | 9/2005 |
| JP | 2007-316286 A | 12/2007 |

* cited by examiner

LIQUID CRYSTAL DISPLAY DEVICE, AND METHOD AND DEVICE FOR MANUFACTURING SAME

TECHNICAL FIELD

The present invention relates to a liquid crystal display device provided with a bezel. Further, the present invention relates to a method and a device for manufacturing the liquid crystal display device.

BACKGROUND ART

In liquid crystal display devices, a liquid crystal panel and a backlight for illuminating the liquid crystal panel are fixed to a bezel (metal frame) as a metal plate being press formed into a frame shape, thereby combining the liquid crystal panel and the backlight and improving the strength of the liquid crystal display devices.

An exemplary conventional method for fixing a bezel will be explained with reference to FIGS. 6A and 6B (see Patent Document 1). As shown in FIG. 6A, a liquid crystal panel 120 and a backlight 130 are stacked on top of a bezel 110 in order. A plurality of arm-like lugs 112 are formed in side walls 111 surrounding the bezel 110. Further, a plurality of recessed notches 132 are formed at back outer edges of the backlight 130. As shown in FIG. 6B, by bending the lugs 112 of the bezel 110 to fit them into the notches 132 of the backlight 130, the backlight 130 is positioned and fixed to the bezel 110.

A different conventional fixing method will be explained with reference to FIGS. 7 to 8. As shown in FIG. 7A, a backlight (not shown) and a liquid crystal panel 220 are stacked in order and are fitted in a recessed portion formed in the top surface of a plastic chassis 240, and a bezel 210 is put over them. A plurality of recessed holes 242 are formed in side surfaces 241 surrounding the chassis 240. Further, a plurality of lugs 212 are formed in side walls 211 surrounding the bezel 210. FIG. 7B is a perspective view of the lug 212. Each lug 212 is cantilevered by the side wall 211 of the bezel 210 with its lower end being a supported end, and is inclined such that its upper end is close to the chassis 240.

With reference to FIGS. 8A to 8C as perspective views showing the lug 212 of the bezel 210 and the hole 242 of the chassis 240, an explanation will be given on their engagement, which occurs when the bezel 210 is moved from the state in FIG. 7A and put over the chassis 240. FIG. 8A shows the state in FIG. 7A. When the side wall 211 of the bezel 210 is lowered from this state, the lug 212 formed in the side wall 211 comes into contact with the side surface 241 of the chassis 240, so that the lug 212 is pressed by the side surface 241 of the chassis 240 and elastically deforms toward the opposite side to the side surface 241 as shown in FIG. 8B. When the bezel 210 is further lowered and the lug 212 reaches the position of the hole 242 of the chassis 240, the lug 212 elastically recovers and is fitted in the hole 242 as shown in FIG. 8C, and the free end of the lug 212 and the inner wall surface of the hole 242 thus come into engagement. As a result, the chassis 240 is fixed to the bezel 210, and the backlight and the liquid crystal panel 220 are sandwiched between the chassis 240 and the bezel 210.

PRIOR ART DOCUMENT

Patent Document

Patent Document 1: JP 5-80334 A

SUMMARY OF INVENTION

Problem to be Solved by the Invention

However, each of the two fixing methods as explained above have the following problems.

In the method of Patent Document 1, the lugs 112 formed in the bezel 110 are bent by plastic deformation. To plastically deform the lugs 112, they need to be bent at a large angle, so that the depth D of the notches 132 formed in the backlight 130 (see FIG. 6B) has to be increased. This makes it difficult to reduce the width of a surrounding area (frame area) around the area of the main surface of the liquid crystal display device in which displaying is actually performed (display area). For this reason, it is difficult to use such a liquid crystal display device in applications where compact-size large screens are required (e.g., mobile applications such as portable phones and PDAs).

Further, when the liquid crystal display device has to be disassembled for some reasons after the assembly, it is necessary to return the plastically deformed lugs 112 to their original state by plastically deforming them in the opposite direction. However, as the lugs 112 may not return to their original state completely or the lugs 112 may be chipped and the side walls 111 may be deformed in the process of returning the lugs 112 to their original state, the bezel 110 cannot be reused.

In the method shown in FIGS. 7 and 8, in contrast, the lugs 212 can be formed at the same time when press forming the bezel 210, so that the level of protrusion of the lugs 212 from the side walls 211 can be determined freely. Thus, unlike the method of Patent Document 1, it is possible to achieve a reduction in the width of the frame area of the liquid crystal display device.

However, since the lugs 212 come into contact with the side surfaces 241 of the chassis 240 when putting the bezel 210 over the chassis 240, the side walls 211 of the bezel 210 may be plastically deformed.

Further, when the liquid crystal display device has to be disassembled for some reasons after the assembly, it is necessary to deform the side walls 211 of the bezel 210 such that they become apart from the side surfaces 241 of the chassis 240. This causes plastic deformation of the side walls 211 of the bezel 210, so that the bezel 210 cannot be reused.

As demands for cost reductions for liquid crystal display devices have been growing, automation of the manufacturing process is desired in order to achieve the cost reductions.

An object of the present invention is to solve the conventional problems described above. That is, a first object of the present invention is to achieve a reduction in the width of the frame area. A second object of the present invention is to automate bezel fixing with use of a machine. A third object of the present invention is to prevent unwilling plastic deformation of a bezel during the manufacturing process. A fourth object of the present invention is to prevent a bezel from plastically deforming to make it reusable even if the liquid crystal display device is disassembled after the assembly.

Means for Solving Problem

The liquid crystal display device of the present invention includes a liquid crystal panel, a backlight device for illuminating the liquid crystal panel, a chassis for holding the liquid crystal panel and the backlight device, a bezel put over the chassis, and at least one engagement structure for fixing the bezel to the chassis. The engagement structure includes a recessed portion formed in a side surface of the chassis and a pair of arms formed in a side wall of the bezel. The pair of arms is each cantilevered. The pair of arms is placed such that a fixed end of each arm is positioned outward relative to a free end of each arm. The pair of arms can mutually support each other by being elastically deformed toward the chassis. The free ends of the arms are at least partially fitted in the recessed portion of the chassis when the pair of arms is in the mutually supporting state, thus fixing the bezel to the chassis.

The manufacturing method of the present invention is a method for manufacturing the liquid crystal display device of the present invention. The method includes the steps of stacking the backlight device and the liquid crystal panel on the chassis; putting the bezel over the chassis on which the backlight device and the liquid crystal panel are stacked; and pressing the arms toward the chassis to elastically deform the arms to make the pair of arms mutually support each other and to fit the free ends of the arms at least partially in the recessed portion of the chassis.

The manufacturing device of the present invention is a device for manufacturing the liquid crystal display device of the present invention. The manufacturing device includes a pressing member for pressing and elastically deforming the arms of the bezel that is put over the chassis.

Effects of the Invention

According to the present invention, the pair of arms formed in the bezel is elastically deformed to be in the mutually supporting state, and to be fitted in the recessed portion formed in the chassis. Since the arms are not plastically deformed, the mutually supporting state can be established even if the level of protrusion of the arms is reduced. Thus, it is possible to achieve a reduction in the width of the frame area.

Further, it is possible to allow the pair of arms to be in the mutually supporting state by a simple operation; pressing the pair of arms to elastically deform it. Thus, the process of fixing the bezel to the chassis can be automated with use of a machine.

The arms and the side wall of the bezel form the same plane when the arms are not elastically deformed. Thus, various parts of the bezel such as the arms and the side walls do not plastically deform because, for example, the arms do not bump into the chassis when putting the bezel over the chassis.

The bezel is fixed to the chassis simply by elastically deforming the arms. Thus, the shape of the bezel remains the same even if the liquid crystal display device is disassembled after the assembly. Therefore, the bezel can be reused after the disassembly.

DESCRIPTION OF THE INVENTION

In the liquid crystal display device of the present invention, it is preferable that when the pair of arms is in the mutually supporting state and the arms are pressed toward the chassis, the pair of arms is released from the mutually supporting state and the pair of arms elastically recovers. This makes it extremely easy to disassemble the liquid crystal display device after the assembly.

In the manufacturing method of the present invention, it is preferable that the pair of arms is pressed at the same time with one pressing member. This makes it easier to achieve the automation of the process of fixing the bezel with use of a machine.

In the manufacturing device of the present invention, it is preferable that the pressing member presses the arms toward the chassis to elastically deform the arms to make the pair of arms mutually support each other and to fit the free ends of the arms at least partially in the recessed portion of the chassis. Further, it is preferable that the pair of arms is pressed at the same time with one pressing member. As a result, the configuration of the manufacturing device can be simplified.

Hereinafter, the present invention will be described in detail by way of a preferred embodiment. It should be noted that the present invention is not limited to the following embodiment. Each of the drawings referred to in the explanation below illustrates in a simple manner only the main components necessary in explaining the present invention. Therefore, the present invention may include components not illustrated in each of the drawings as needed. The dimensions of the components in each of the drawings may not represent the actual dimensions of the components or the proportions in dimensions of the respective components.

Figure 1:
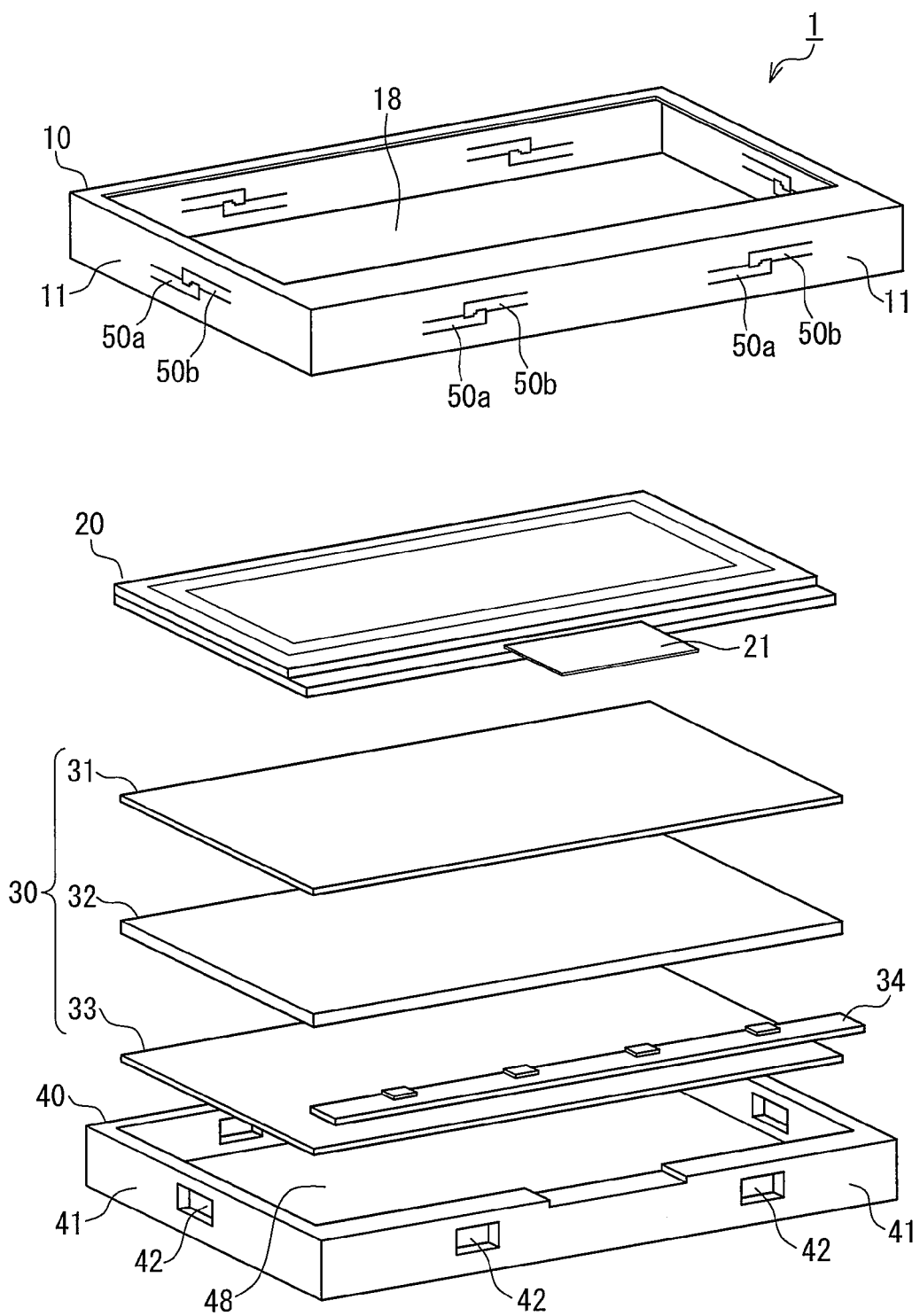
FIG. 1 is an exploded perspective view showing a schematic configuration of a liquid crystal display device according to one embodiment of the present invention.

FIG. 1 is an exploded perspective view showing a schematic configuration of a liquid crystal display device 1 according to one embodiment of the present invention. The liquid crystal display device 1 according to the present embodiment includes a bezel 10, a liquid crystal panel 20, a backlight device 30, and a chassis 40 in this order. In the explanation below, the bezel 10 side and the chassis 40 side of FIG. 1 will be referred to as the "upper side" and the "lower side", respectively.

The chassis 40 is a substantially rectangular plate body made of resin (preferably of polycarbonate), for example. A substantially rectangular recessed portion 48 is formed in the top surface of the chassis 40. Further, a plurality of recessed holes 42 are formed in side surfaces 41 surrounding the chassis 40. In the present embodiment, two holes 42 are formed in the side surfaces along the longer sides of the chassis 40 and one hole 42 is formed in the side surfaces along the shorter sides of the chassis 40.

The backlight device 30 includes, from the liquid crystal panel 20 side, an optical sheet 31, a light guide plate 32, and a reflection sheet 33. The backlight device 30 further includes a light source 34 facing one side surface of the light guide plate 32.

The light source 34 produces illumination light for illuminating the liquid crystal panel 20. In the present embodiment, the light source used includes a plurality of light-emitting diodes mounted on a flexible board as light-emitting sources. In addition to light-emitting diodes, discharge fluorescent tubes (e.g., cold cathode fluorescent tubes, hot cathode fluorescent tubes, and xenon fluorescent tubes), EL elements, and the like can be used as the light-emitting sources.

The light guide plate 32 is a substantially rectangular plate body made of synthetic resin such as transparent acrylic resin (e.g., PMMA). Light from the light source 34 enters the side surface of the light guide plate 34, propagates within the light guide plate 32 while being totally reflected and is diffused. And the light is emitted from the principle surface (this principle surface is referred to as an emission surface) opposing the liquid crystal panel 20.

The reflection sheet 33 opposes the principal surface of the light guide plate 32 opposite to the emission surface, and allows leakage light from the light guide plate 32 to reenter the light guide plate 32 to utilize the light effectively.

The optical sheet 31 is for turning light emitted from the emission surface of the light guide plate 32 into illumination light with uniform luminance and is composed of at least one sheet such as a lens sheet or diffusion sheet.

The liquid crystal panel 20 includes a pair of transparent substrates and a liquid crystal layer enclosed with the pair of transparent substrates, and controls the passage of illumination light emitted from the backlight device 30 pixel by pixel. The reference numeral 21 denotes a flexible board for inputting/outputting signals into/from the liquid crystal panel 20.

The bezel 10 is in the form of a frame having a substantially rectangular opening 18 at the center. The bezel 10 can be manufactured by, for example, press forming a metal plate. The bezel 10 includes side walls 11 at its circumference, and the side walls 11 oppose the side surfaces 41 of the chassis 40 when the bezel 10 is put over the chassis 40, as will be described later. Pairs of arms 50a, 50b are formed in the side walls 11 of the bezel 10 at the positions corresponding to the respective holes 42 formed in the side surfaces 41 of the chassis 40.

Figure 2:
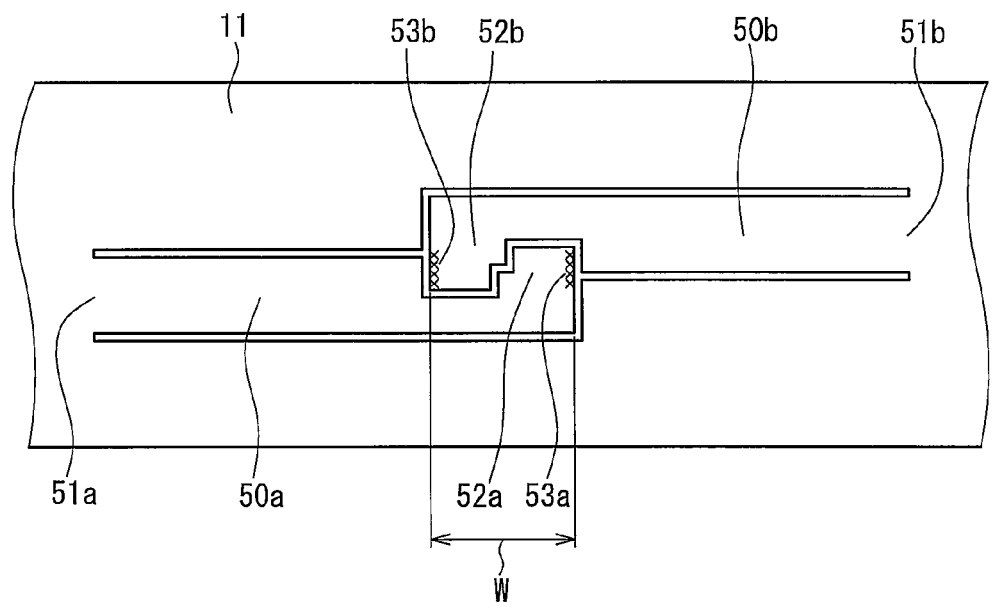
FIG. 2 is an enlarged plan view showing a pair of arms formed in a bezel of the liquid crystal display device shown in FIG. 1.

FIG. 2 is an enlarged plan view of one pair of arms 50a, 50b and its surroundings. The arms 50a and 50b have the same shape and are each cantilevered by the side wall 11 of the bezel 10. The pair of arms 50a, 50b is placed such that fixed ends 51a, 51b are positioned outward relative to free ends 52a, 5b, respectively. The longitudinal direction of the arms 50a, 50b (the direction connecting the fixed ends 51a, 51b and the free ends 52a, 52b, respectively) is perpendicular to the vertical direction (the vertical direction on the surface of FIG. 2). The free ends 52a, 52b of the arms 50a, 50b each include a portion substantially in a hook shape, and the arms 50a, 50b are placed with the substantially hook-shaped portions being in engagement. The cross-hatched portions denoted by the reference numerals 53a, 53b are contact portions (described later in detail). The arms 50a, 50b having such a shape can be formed by punching out the side walls using a press forming machine.

Hereinafter, an explanation will be given on a method for manufacturing the liquid crystal display device 1 according to the present embodiment having the configuration as above.

Figure 3A:
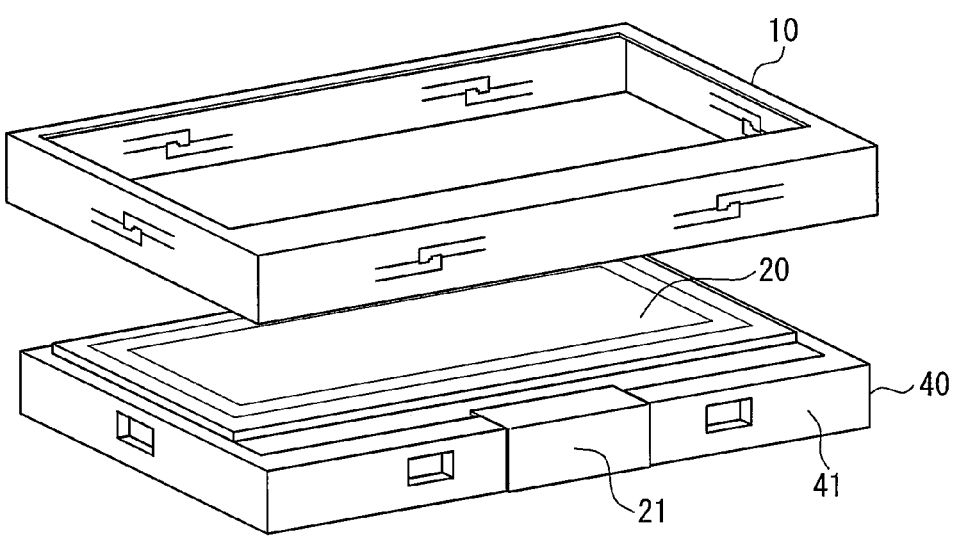
FIG. 3A is a perspective view of one process of manufacturing the liquid crystal display device shown in FIG. 1, showing a state immediately before putting the bezel over a chassis.

First, as shown in FIG. 3A, the backlight device 30 and the liquid crystal panel 20 are stacked in the recessed portion 48 of the chassis 40 in order. The flexible board 21 connected to the liquid crystal panel 20 is bent along one side surface 41 of the chassis 40.

Figure 3B:
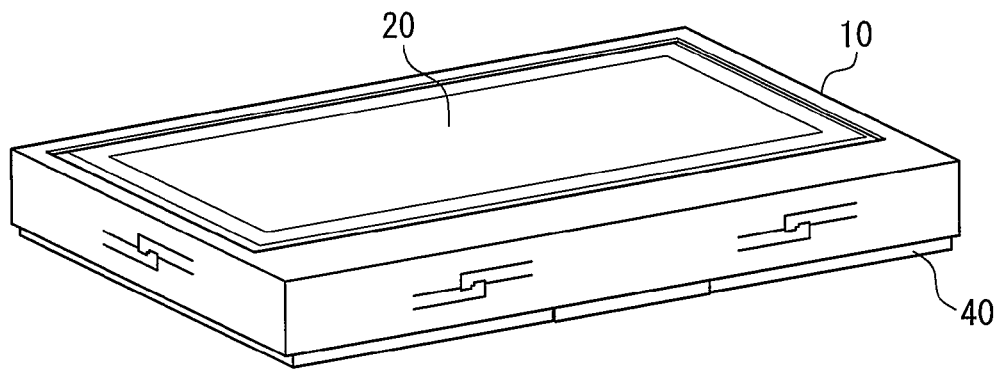
FIG. 3B is a perspective view of one process of manufacturing the liquid crystal display device shown in FIG. 1, showing a state in which the bezel is put over the chassis.

Next, as shown in FIG. 3B, the bezel 10 is put over the chassis 40.

Figure 3C:
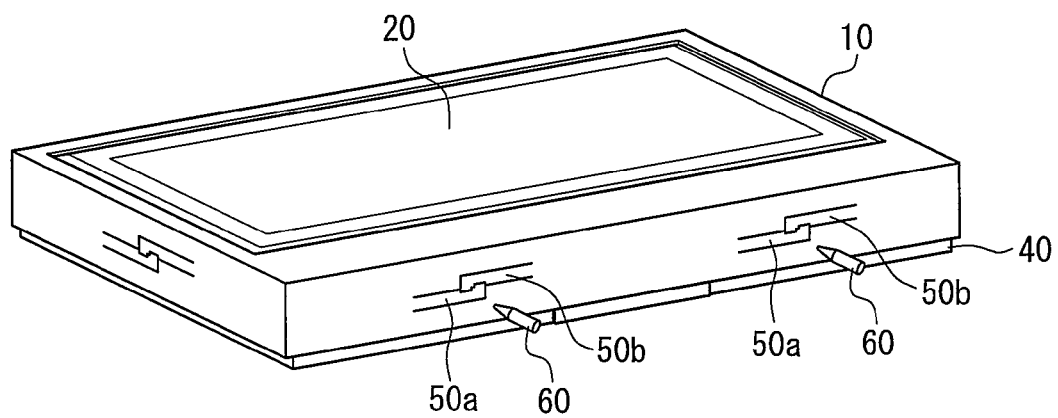
FIG. 3C is a perspective view of one process of manufacturing the liquid crystal display device shown in FIG. 1, showing a state in which arms of the bezel are pressed with a pusher.

Then, as shown in FIG. 3C, the free ends 52a, 52b of each pair of arms 50a, 50b are pressed with a rodlike pusher 60 as a pressing member.

Figure 4A:
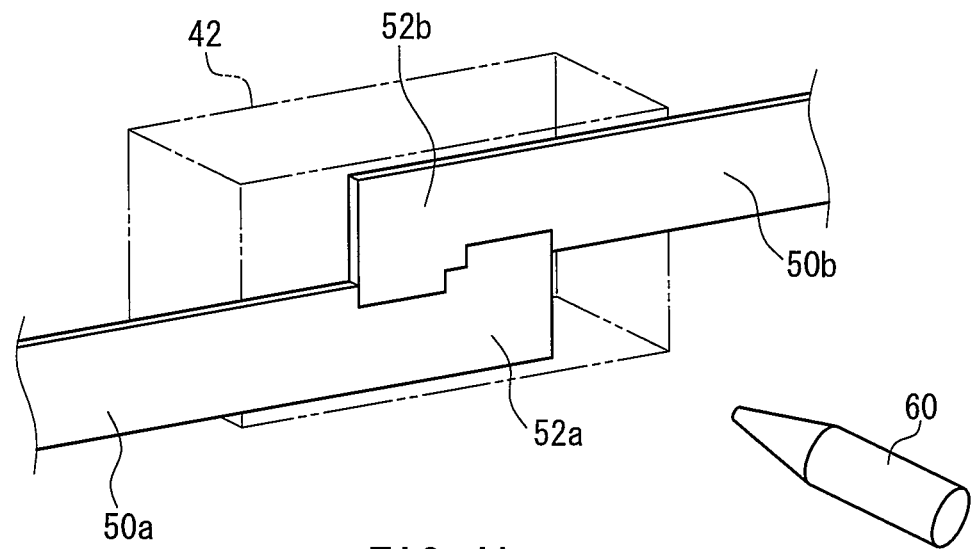
FIG. 4A is a perspective view showing a pair of arms immediately before being pressed with the pusher.
Figure 4B:
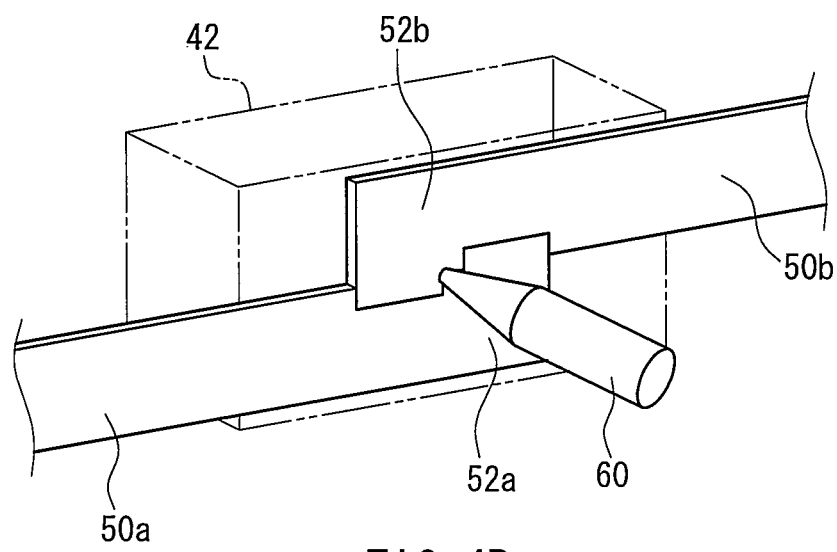
FIG. 4B is a perspective view showing the pair of arms immediately after the tip of the pusher is brought into contact with them.
Figure 4C:
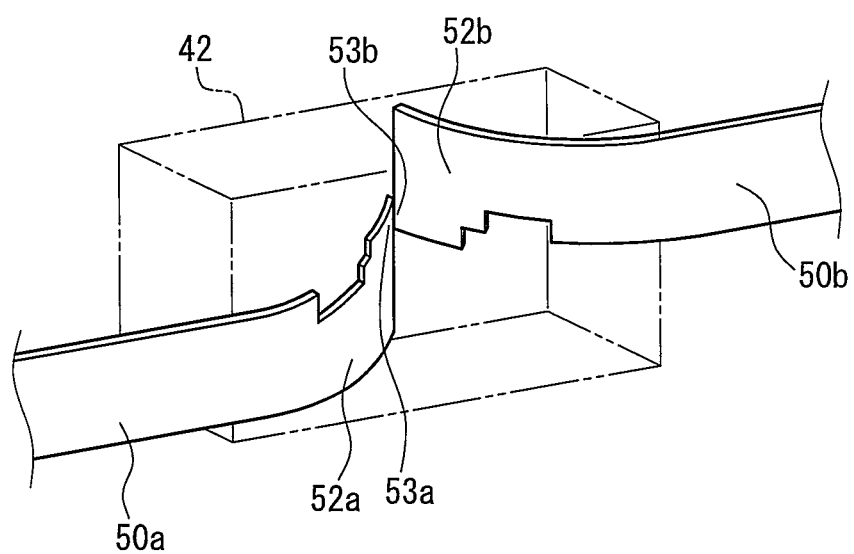
FIG. 4C is a perspective view showing the pair of arms in the mutually supporting state.

The deformation of the pair of arms 50a, 50b pressed with the pusher 60 will be explained with reference to FIGS. 4A to 4C. In FIGS. 4A to 4C, the hole 42 formed in the side surface of the chassis 40 is illustrated by two-dot chain lines. Further, the side wall 11 (see FIGS. 1 and 2) around the pair of arms 50a, 50b is not illustrated.

FIG. 4A shows a state before the pusher 60 is brought into contact with the arms 50a, 50b. The hole 42 opposes the free ends 52a, 52b of the arms 50a, 50b.

FIG. 4B shows a state immediately after the pusher 60 is brought into contact with the arms 50a, 50b. The pusher 60 is pressing the free ends 52a, 52b of the arms 50a, 50b at the same time. When the pusher 60 is further pressed in from this state, the arms 50a, 50b elastically deform and the free ends 52a, 52b are partially fitted in the hole 42.

FIG. 4C shows a state in which the pusher 60 is pulled back after being pressed in by a certain amount. The contact portion 53a at the tip of the free end 52a of the arm 50a and the contact portion 53b at the tip of the free end 52b of the arm 50b are in contact with each other, and the arms 50a, 50b are at rest with the arms 50a, 50b mutually pressing and supporting each other (this state will be referred to as the "mutually supporting state") by the force with which each of the elastically-deformed arms 50a, 50b attempts to return to its original state (elastic recovery force). And in this state, the free ends 52a, 52b of the arms 50a, 50b are fitted in the hole 42.

For all of the pairs of arms 50a, 50b formed in the bezel 10, the free ends 52a, 52b are fitted in the corresponding holes 42 as shown in FIG. 4C.

In this way, the bezel 10 is fixed to the chassis 40 through the engagement structure including the holes 42 and the arms 50a, 50b, thus completing the liquid crystal display device 1 according to the present embodiment.

To disassemble the liquid crystal device 1 for repairs of defective pieces or the like after the assembly, the arms 50a, 50b may be released from the mutually supporting state shown in FIG. 4C. To do so, the arms 50a, 50b in the mutually supporting state may be pressed again with a pressing member similar to the pusher 60 at or near the contact portions 53a, 53b at the tip of the free ends 52a, 52b so as to press them into the hole 42. At this time, it is preferable to press only one of the free ends 52a, 52b with the pressing member because the arms can be released from the mutually supporting state with ease. Each of the arms 50a, 50b released from the mutually supporting state elastically recovers right away, and returns to the original state shown in FIG. 4A. Consequently, the arms 50a, 50b and the hole 42 are disengaged from each other, and the bezel 10 can thus be removed from the chassis 40.

As described above, according to the present embodiment, it is possible to allow the arms 50a, 50b to be in the mutually supporting state shown in FIG. 4C simply by pressing the free ends 52a, 52b of the arms 50a, 50b with the pusher 60 toward the hole 42 after putting the bezel 10 over the chassis 40. Therefore, the process of fixing the bezel 10 to the chassis 40 can be automated easily with use of a machine.

Figure 7A:
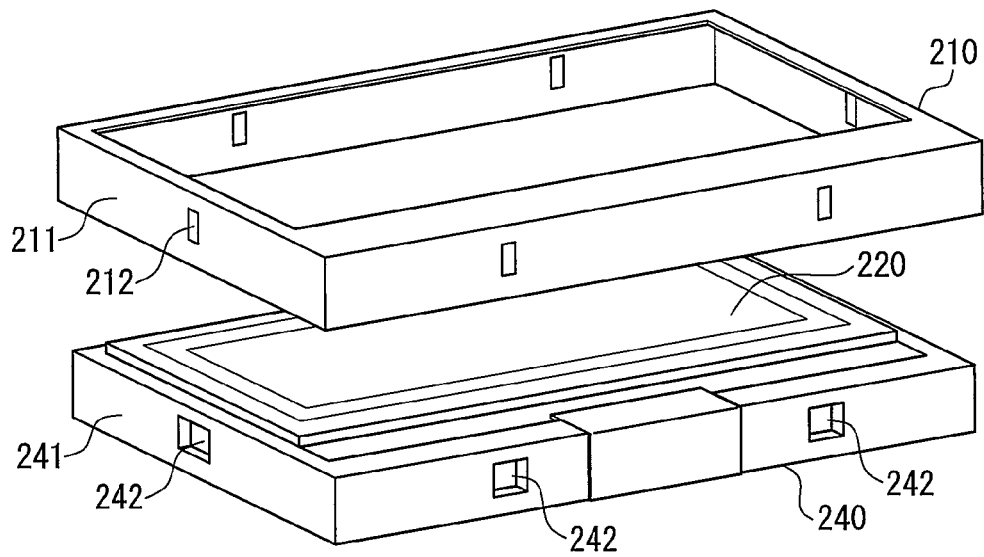
FIG. 7A is an exploded perspective view of a different conventional liquid crystal display device.
Figure 7B:
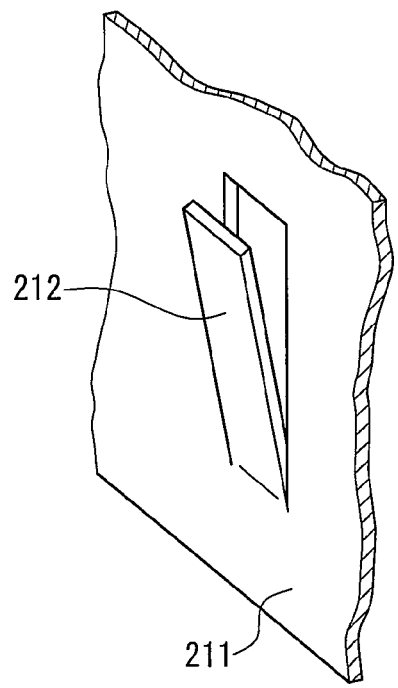
FIG. 7B is an enlarged perspective view of a lug formed in a side wall of a bezel in the liquid crystal display device shown in FIG. 7A.
Figure 8A:
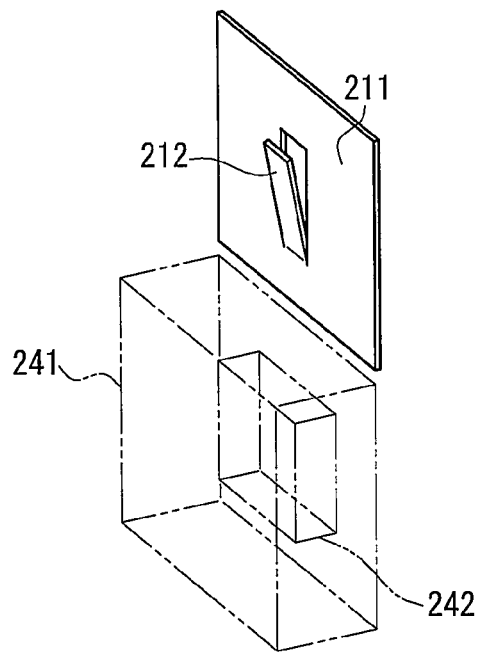
FIG. 8A is an enlarged perspective view showing one process in which the lug of the bezel and a hole of a chassis come into engagement in the liquid crystal display device shown in FIG. 7A.
Figure 8B:
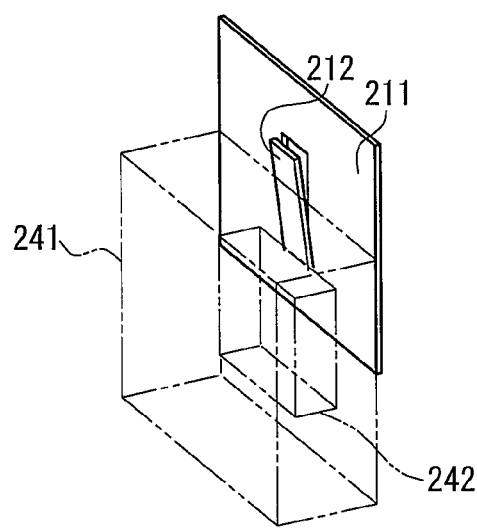
FIG. 8B is an enlarged perspective view showing one process in which the lug of the bezel and the hole of the chassis come into engagement in the liquid crystal display device shown in FIG. 7A.
Figure 8C:
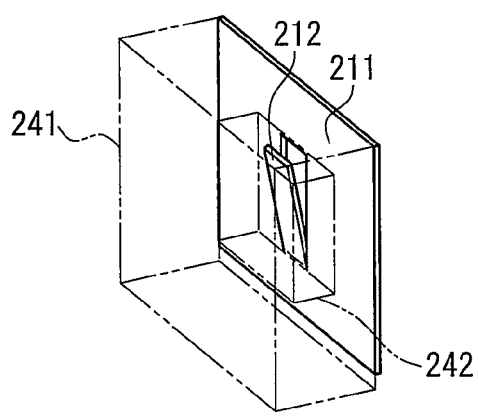
FIG. 8C is an enlarged perspective view showing one process in which the lug of the bezel and the hole of the chassis come into engagement in the liquid crystal display device shown in FIG. 7A.

When the arms 50a, 50b are in the original state where they are not elastically deformed, the arms 50a, 50b and the side wall 11 form the same plane, so that the arms 50a, 50b do not bump into the side surfaces 41 of the chassis 40 when putting the bezel 10 over the chassis 40. Thus, the present embodiment does not cause plastic deformation similar to that occurred to the side walls 211 of the bezel 210 in the conventional process of assembling a liquid crystal display device shown in FIG. 7A.

When the arms 50a, 50b are in the mutually supporting state as shown in FIG. 4C, the arms 50a, 50b are not plastically deformed but are only elastically deformed. Thus, any parts of the bezel 10 including the arms 50a, 50b and the side walls 11 do not plastically deform even if the liquid crystal display device 1 is assembled/disassembled repeatedly. For this reason, the bezel 10 can be reused.

Further, the arms 50a, 50b can be released from the mutually supporting state shown in FIG. 4C by an extremely simple operation; by simply pressing the free ends 52a, 52b of the arms 50a, 50b toward the hole 42.

In the present embodiment, when the arms 50a, 50b are in the mutually supporting state shown in FIG. 4C, the level of protrusion of the free ends 52a, 52b from the side wall 11 to the hole 42 is dependent on the distance W between the contact portions 53a, 53b in the original state (see FIG. 2). Even if the distance W is reduced, the arms 50a, 50b can be kept stably in the mutually supporting state shown in FIG. 4C as long as the strength (bend elastic constant) of each of the arms 50a, 50b is set adequately. Thus, by reducing the distance W to reduce the level of protrusion, it is possible to achieve a reduction in the width of the frame area of the liquid crystal display device 1 on the front side.

The embodiment described above is merely an example, and the present invention is thus not limited to it and can be modified as needed.

Figure 5A:
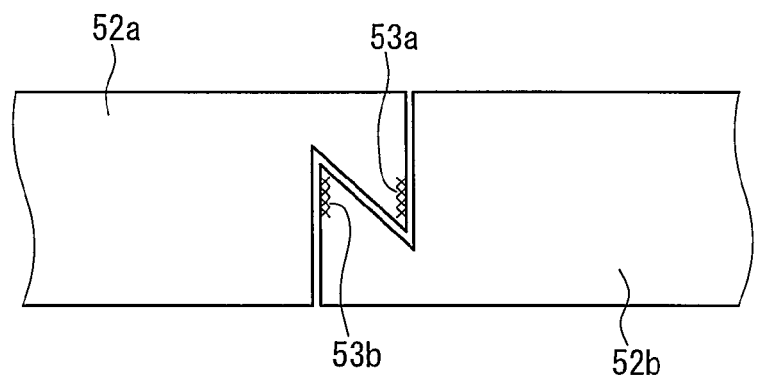
FIG. 5A is an enlarged plan view showing the free ends of the pair of arms of the liquid crystal display device of the present invention in a different shape as an example.
Figure 5B:
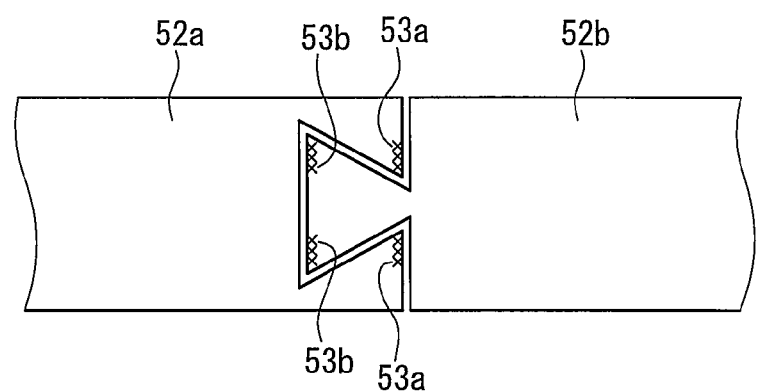
FIG. 5B is an enlarged plan view showing the free ends of the pair of arms of the liquid crystal display device of the present invention in a still different shape as an example.
Figure 5C:
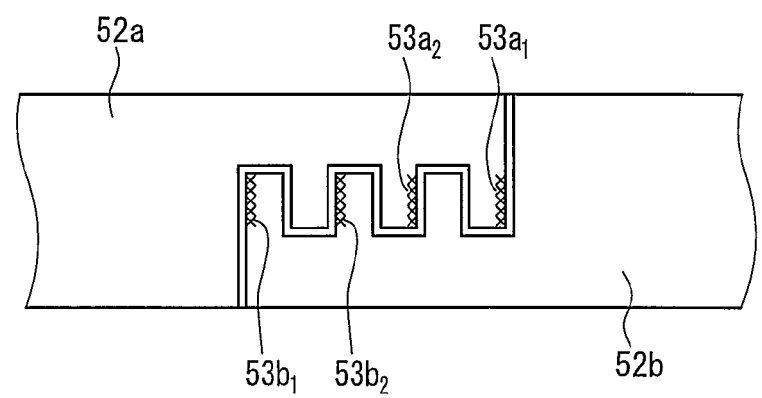
FIG. 5C is an enlarged plan view showing the free ends of the pair of arms of the liquid crystal display device of the present invention in a still different shape as an example.

For example, the arms 50a, 50b formed in the side walls 11 of the bezel 10, particularly the free ends 52a, 52b may not be in a substantially hook shape shown in FIG. 2. For example, the free ends 52a, 5b may be in a substantially N shape as shown in FIG. 5A, a dovetail shape as shown in FIG. 5B, and a comb-like shape as shown in FIG. 5C. FIGS. 5A to 5C each show the shape of the free ends 52a, 52b in the original state (the state with no elastic deformation). In FIGS. 5A and 5B, the cross-hatched contact portions 53a and 53b come into contact with each other in the mutually supporting state. In FIG. 5C, the mutually supporting state can be established by brining the contact portions $53a_1$ and $53b_1$ with each other or by bringing the contact portions $53a_2$ and $53b_2$ with each other. By changing in this way the positions at which the arms 50a, 50b come into contact with each other, it is possible to change the level of protrusion of the free ends 52a, 52b from the side walls 11 in the mutually supporting state.

Figure 6A:
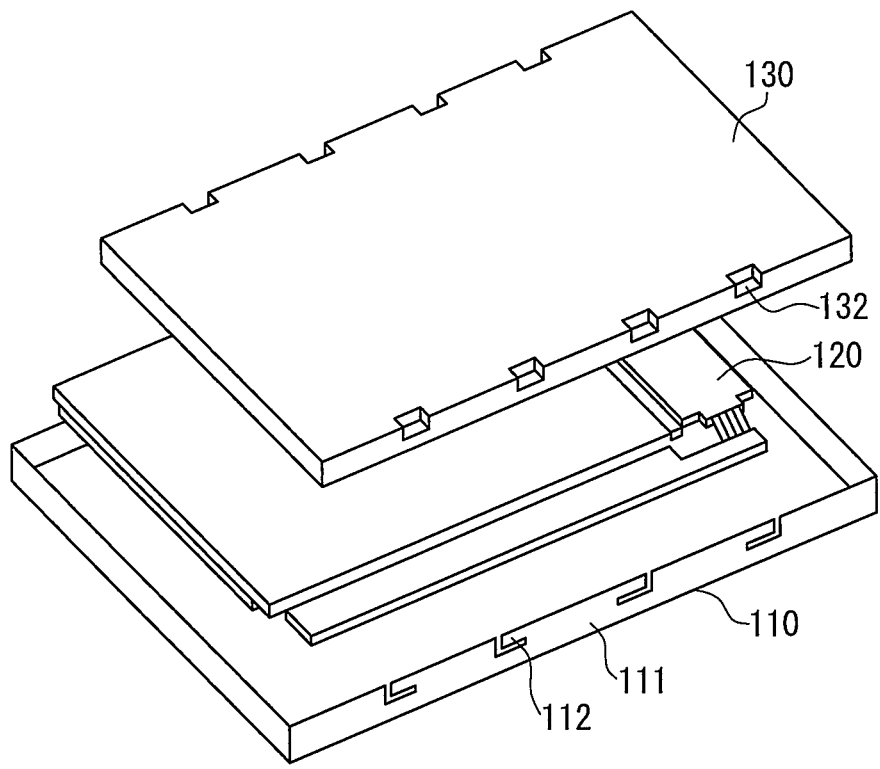
FIG. 6A is an exploded perspective view of a conventional liquid crystal display device.
Figure 6B:
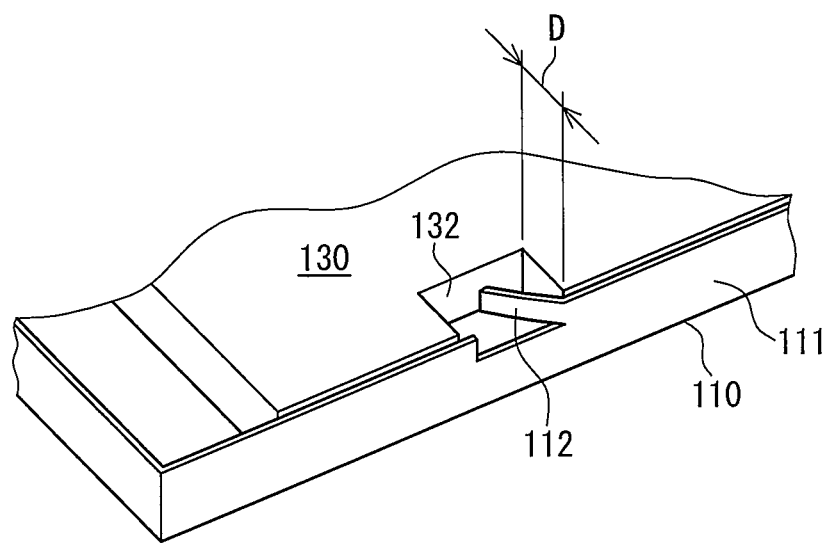
FIG. 6B is an enlarged perspective view showing an engagement structure for fixing a backlight to a bezel in the liquid crystal display device shown in FIG. 6A.

In the above embodiment, the holes 42 formed in the side surfaces 41 of the chassis 40 are used as an example of recessed portions in which the free ends 52a, 5b are partially fitted when the arms 50a, 50b are in the mutually supporting state. However, as with the notches 132 shown in FIG. 6A, recessed notches formed at the lower edge of each side surface 41 of the chassis 40 may be used.

In the above embodiment, the direction connecting the fixed end 51a of the arm 50a and the fixed end 51b of the arm 50b is perpendicular to the vertical direction, but the arms 50a, 50b may be placed such that the connecting direction is parallel to the vertical direction.

The configuration of the liquid crystal display device of the present invention can be determined freely except for the engagement structure for fixing the bezel to the chassis. For example, the engagement structure of the present invention can be applied to a known liquid crystal display device to configure the liquid crystal display device of the present invention.

In the above embodiment, the rodlike pusher 60 is used as a pressing member to press and elastically deform the arms 50a, 50b. However, as long as the pusher 60 can press the arms 50a, 50b, its shape and the like can be modified as needed.

Further, in the above embodiment, the arms 50a, 50b are pressed at the same time with one pressing member (pusher 60). However, the present invention is not limited to this, and the arms 50a, 50b may be pressed separately with two pressing members, for example.

When the bezel includes a plurality of pairs of arms 50a, 50b, the plurality of pairs of arms 50a, 50b may be pressed with a plurality of pressing members at a time or several times.

The above-described embodiment is intended merely to clarify the technical content of the present invention. The present invention is not to be construed as being limited to these specific examples, but is to be construed in a broad sense, and may be practiced with various modifications within the sprit and the scope of the claims.

Industrial Applicability

The application fields of the present invention are not particularly limited. However, since reductions in cost and in the width of the frame area can be achieved with the present invention, it can be used particularly preferably as a liquid crystal display device for use in mobile applications such as portable phones and PDAs where compact-size large screen display devices are required.

DESCRIPTION OF REFERENCE NUMERALS 1 liquid crystal display device
10 bezel
11 side wall of bezel
20 liquid crystal panel
30 backlight device
40 chassis
41 side surface of chassis
42 hole (recessed portion)

50a, 50b arm
51a, 51b fixed end of arm
52a, 52b free end of arm
53a, 53b contact portion of arm
60 pusher (pressing member)

The invention claimed is:

1. A liquid crystal display device comprising:
a liquid crystal panel, a backlight device configured to illuminate the liquid crystal panel, a chassis configured to hold the liquid crystal panel and the backlight device, a bezel put over the chassis, and at least one engagement structure configured to fix the bezel to the chassis, wherein
the engagement structure includes a recessed portion located in a side surface of the chassis and a pair of arms provided in a side wall of the bezel,
each of the pair of arms is cantilevered,
the pair of arms is placed such that a fixed end of each arm is positioned outward relative to a free end of each arm, and
the free ends of the arms are at least partially fitted in the recessed portion of the chassis in a state in which the pair of arms are elastically deformed toward the chassis and the free ends of the arms are in contact with each other, thus fixing the bezel to the chassis.

2. The liquid crystal display device according to claim 1, wherein when the arms are pressed toward the chassis in the state in which the free ends of the arms are in contact with each other, the free ends are released and the pair of arms elastically recovers.

3. A device for manufacturing the liquid crystal display device according to claim 1, comprising a pressing member configured to press and elastically deform the arms of the bezel that is put over the chassis.

4. The device according to claim 3, wherein the pressing member is configured to press the arms toward the chassis to elastically deform the arms to make the free ends being in contact with each other and to fit the free ends of the arms at least partially in the recessed portion of the chassis.

5. The device according to claim 3, wherein each of the pair of arms is pressed towards the chassis at the same time with one pressing member.

6. A method for manufacturing a liquid crystal display device including:
a liquid crystal panel, a backlight device configured to illuminate the liquid crystal panel, a chassis configured to hold the liquid crystal panel and the backlight device, a bezel put over the chassis, and at least one engagement structure configured to fix the bezel to the chassis, wherein
the engagement structure includes a recessed portion located in a side surface of the chassis and a pair of arms provided in a side wall of the bezel,
each of the pair of arms is cantilevered,
the pair of arms is placed such that a fixed end of each arm is positioned outward relative to a free end of each arm,
the method comprising the steps of:
stacking the backlight device and the liquid crystal panel on the chassis;
putting the bezel over the chassis on which the backlight device and the liquid crystal panel are stacked; and
pressing the arms toward the chassis to elastically deform the arms so that the free ends of the arms are in contact with each other and to fit the free ends of the arms at least partially in the recessed portion of the chassis.

7. The method according to claim 6, wherein each of the pair of arms is pressed towards the chassis at the same time with one pressing member.

* * * * *